(12) United States Patent
Ahn et al.

(10) Patent No.: US 10,940,792 B2
(45) Date of Patent: Mar. 9, 2021

(54) REAR LAMP APPARATUS OF VEHICLE

(71) Applicants: Hyundai Motor Company, Seoul (KR); Kia Motors Corporation, Seoul (KR)

(72) Inventors: Byoung Suk Ahn, Gyeonggi-do (KR); Seung Hyeok Chang, Gyeonggi-do (KR); Jung Wook Lim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 222 days.

(21) Appl. No.: 15/827,566

(22) Filed: Nov. 30, 2017

(65) Prior Publication Data
US 2019/0071001 A1 Mar. 7, 2019

(30) Foreign Application Priority Data
Sep. 5, 2017 (KR) .................. 10-2017-0113080

(51) Int. Cl.
| | |
|---|---|
| *G06K 19/00* | (2006.01) |
| *B60Q 1/30* | (2006.01) |
| *F21S 43/15* | (2018.01) |
| *F21S 43/33* | (2018.01) |
| *F21S 43/40* | (2018.01) |
| *F21S 43/20* | (2018.01) |

(Continued)

(52) U.S. Cl.
CPC .............. *B60Q 1/302* (2013.01); *B60Q 1/22* (2013.01); *F21S 43/14* (2018.01); *F21S 43/15* (2018.01); *F21S 43/26* (2018.01); *F21S 43/315* (2018.01); *F21S 43/33* (2018.01); *F21S 43/40* (2018.01); *G02B 6/0018* (2013.01); *G02B 6/0046* (2013.01)

(58) Field of Classification Search
USPC ....................................................... 362/509
See application file for complete search history.

(56) References Cited

U.S. PATENT DOCUMENTS

| | | | |
|---|---|---|---|
| 2003/0179322 A1* | 9/2003 | Sacre ................. | G02B 27/1046 349/5 |
| 2009/0154186 A1* | 6/2009 | Natsume ............. | B60Q 1/0041 362/516 |

(Continued)

FOREIGN PATENT DOCUMENTS

KR    20-2000-0000644    1/2000

*Primary Examiner* — Matthew Mikels
(74) *Attorney, Agent, or Firm* — Mintz Levin Cohn Ferris Glovsky and Popeo, P.C.; Peter F. Corless (57) ABSTRACT

A rear lamp apparatus of a vehicle is provided. The apparatus includes a light source that emits light having a first wavelength band, a light filter disposed with a first side facing an exterior and a second side facing an interior, that reflects light having the first wavelength band, and transmits light having a second wavelength band that is different from the first wavelength band. A light diffraction element is disposed to receive light emitted from the light source and changes a transmission path of incident light to direct. The light emitted is transmitted to the first side of the light filter by the light diffraction element and is reflected to be directed toward the exterior of the vehicle to prevent the transmission to the interior of the vehicle. Accordingly, a rear lamp is turned on at a side of rear glass and exterior and interior visual fields are improved.

9 Claims, 5 Drawing Sheets

(51) Int. Cl.
*F21S 43/31* (2018.01)
*F21S 43/14* (2018.01)
*B60Q 1/22* (2006.01)
*F21V 8/00* (2006.01)

(56) References Cited

U.S. PATENT DOCUMENTS

2010/0046075 A1* 2/2010 Powell ............... G02B 5/09
 359/576
2015/0323810 A1* 11/2015 Colas ............... G02C 7/025
 351/159.76

\* cited by examiner

REAR LAMP APPARATUS OF VEHICLE

CROSS REFERENCE TO RELATED APPLICATION

The present application claims priority to Korean Patent Application No. 10-2017-0113080, filed on Sep. 5, 2017, the entire contents of which is incorporated herein for all purposes by this reference.

BACKGROUND

1. Technical Field of the Disclosure

The present disclosure relates to a rear lamp apparatus of a vehicle and, more particularly, to a rear lamp apparatus of a vehicle that provides a lighting area on rear glass and secures a visual field through the lighting area.

2. Description of the Related Art

Typically, front lamps (e.g., head lamps) for illuminating the road ahead of a vehicle at night are disposed at the front of a vehicle, and a back lamp that is turned on when shifting into a reverse gear is performed and brake lamps that are turned on when the brake pedal is engaged are disposed at the rear of a vehicle. Accordingly, it is possible to prevent an accident such as a rear-end collision by enabling the driver in a rearward vehicle to recognize the operational state of a vehicle, (e.g., when the vehicle is intending to turn, change lanes or is stopped). In particular, rear lamps include a lens and a housing which are separate parts, and an optical system is disposed in the housing. As described above, rear lamps are formed from separate components and are attached to a body separately from rear glass, and require a specific compartment.

The description provided above as a related art of the present disclosure is merely for assisting in the understanding the background of the present disclosure and should not be construed as being included in the related art known by those skilled in the art.

SUMMARY

A rear lamp apparatus of a vehicle that turns on rear lamps on rear glass and is able to secure a visual field outdoors through a lighting area in non-lighting is provided.

In an aspect of an exemplary embodiment of the present disclosure, a rear lamp apparatus of a vehicle may include a light source configured to emit light having a first wavelength band, a light filter disposed with a first side facing an exterior of the vehicle and a second side facing an interior of the vehicle, configured to reflect light having the first wavelength band, and transmit light having a second wavelength band that is different from the first wavelength band and a light diffraction element configured to receive light emitted from the light source and adjust a transmission path of incident light to direct the light to be incident to the first side of the light filter. Accordingly, light emitted from the light source may be directed to the first side of the light filter by the light diffraction element and may be reflected from the light filter to be transmitted toward the exterior of the vehicle to prevent transmission to the interior of the vehicle.

In some exemplary embodiments, the light diffraction element may be a diffractive lens that when the light emitted from the light source is received, may be configured to diffract a transmission direction of the incident light to direct light toward the light filter. The light source may be disposed at a side above or below the light filter, and the light diffraction element may be configured to receive light emitted from the light source disposed above or below the light filter.

In other exemplary embodiments, a plurality of light sources may have a linear arrangement at a side of the light filter to direct light emitted from each of the light sources to the light filter through the light diffraction element. The greater the distance that the light sources are disposed at a side from the light filter, the greater the intensity of light may be set.

In another exemplary embodiment, the apparatus may include a light guide disposed at a side of the light filter and configured to guide light emitted with a specific incident angle from the light source to the exterior. The light guide may be a hologram lens configured to produce a specific image by reflecting light emitted from the light source and having a specific incident angle to the exterior. The light guide may be a diffractive lens that when the light emitted from the light source is received, may be configured to transmit the incident light, and when the transmitted light is reflected by the light filter to be incident at a specific angle, may be configured to diffract the transmission direction of the light toward the exterior.

According to an exemplary embodiment of the present disclosure, a rear lamp apparatus may include light sources disposed at a rear portion in a vehicle and configured to emit light having a specific wavelength band, a light filter disposed in the vehicle to correspond to a rear glass at the rear portion of the vehicle, with a first side facing an exterior facing the rear glass and a second side facing an interior of the vehicle, reflecting light having a first wavelength band, and transmit light having a second wavelength different from the first wavelength band and a light diffraction element configured to receive light emitted from the light source and adjust a transmission path of incident light to direct the light to be incident to the first side of the light filter. The light emitted from the light source may be directed to the first side of the light filter by the light diffraction element and may be reflected from the light filter to be emitted to the exterior of the vehicle to prevent transmission to the interior of the vehicle.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
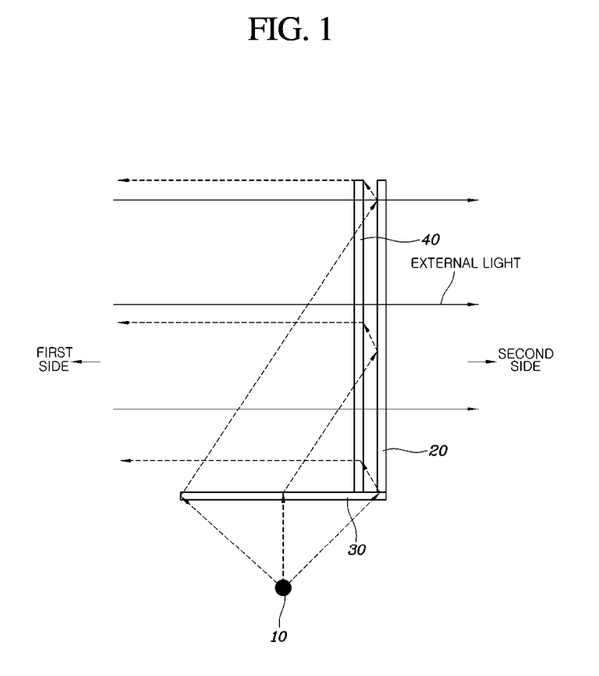
FIG. 1 is an exemplary view showing the configuration of a rear lamp of a vehicle according to a first exemplary embodiment of the present disclosure.
Figure 2:
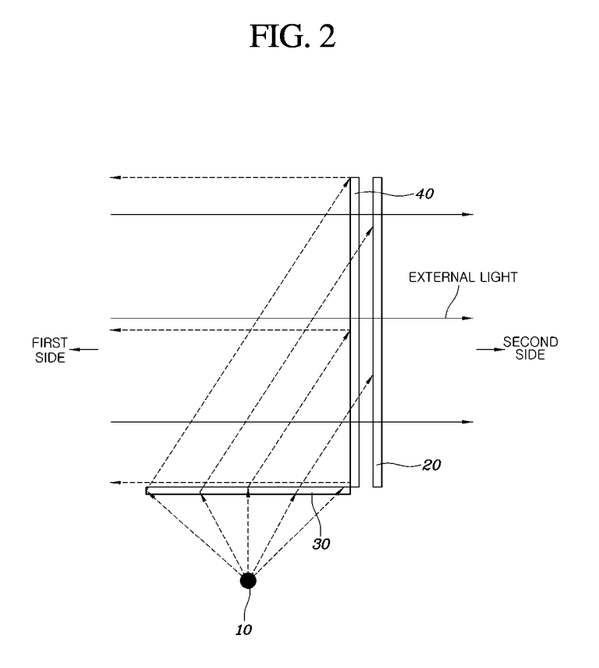
FIG. 2 is an exemplary view showing the configuration of a rear lamp of a vehicle according to a second exemplary embodiment of the present disclosure.
Figure 3:
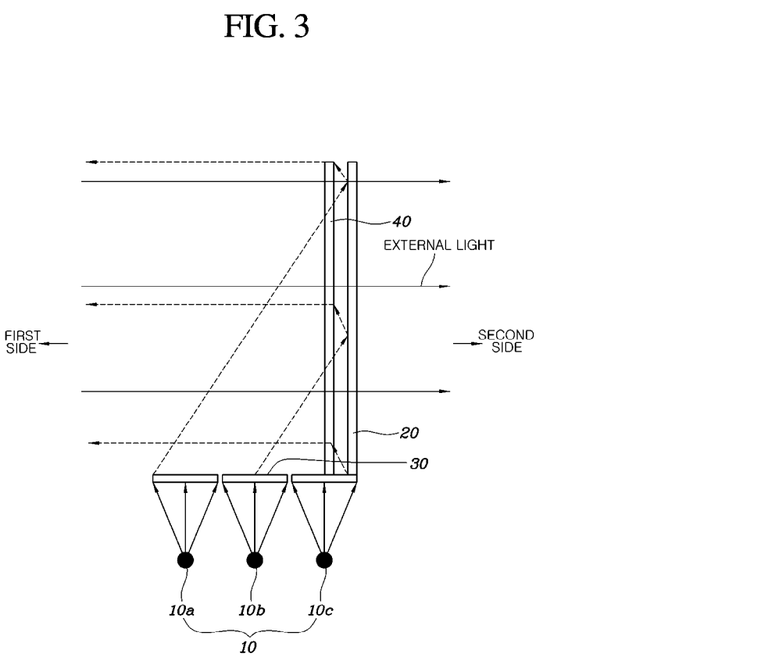
FIGS. 3 to 5 are exemplary views illustrating a rear lamp of a vehicle according to an exemplary embodiment of the present disclosure.
Figure 4:
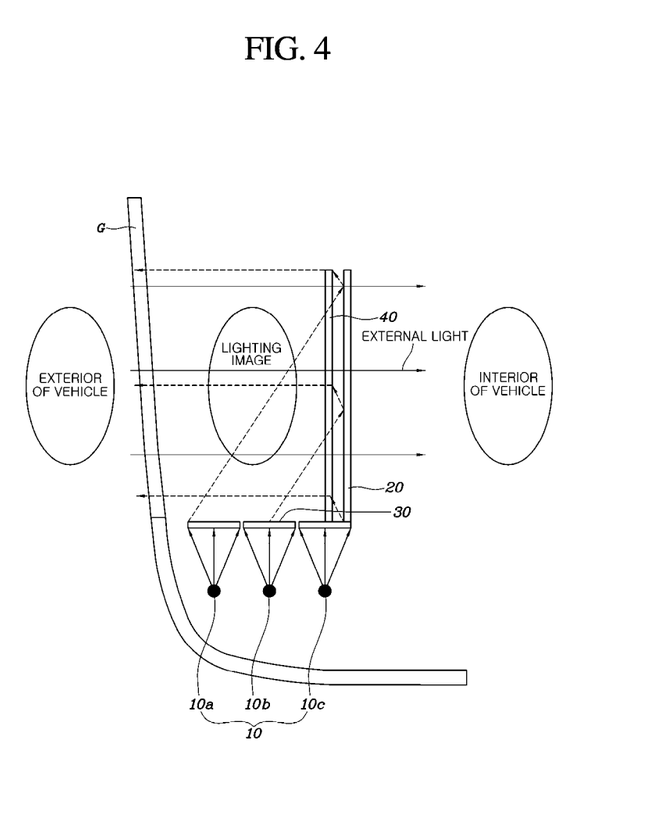
Figure 5:
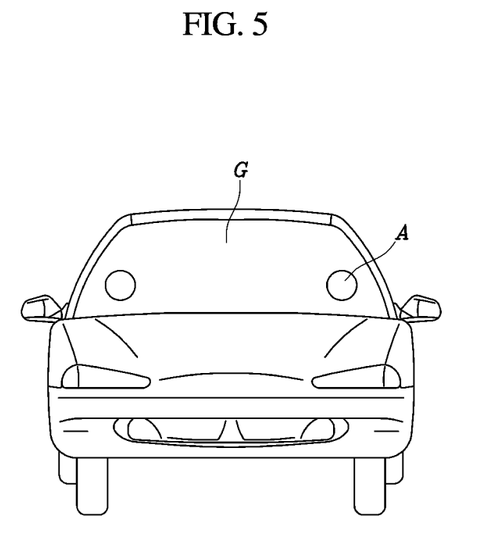

Hereinafter, rear lamp apparatuses of vehicles according to exemplary embodiments of the present disclosure are described with reference to the accompanying drawings. FIG. 1 is an exemplary view showing a rear lamp of a vehicle according to a first exemplary embodiment of the present disclosure. FIG. 2 is an exemplary view showing the configuration of a rear lamp of a vehicle according to a second exemplary embodiment of the present disclosure. FIGS. 3 to 5 are exemplary views illustrating a rear lamp of a vehicle according to an exemplary embodiment of the present disclosure.

A rear lamp apparatus of a vehicle according to an exemplary embodiment of the present disclosure, as shown in FIG. 1, may include a light source 10 configured to emit light having a first wavelength band, a light filter 20 that is disposed with a first side facing the exterior of the vehicle and a second side facing the interior of the vehicle, and configured to reflect light having the first wavelength band, and transmits light having a second wavelength bands different from the first wavelength band, and a light diffraction element 30 configured to receive light emitted from the light source 10 and adjust a transmission path of incident light to direct the light to be incident to the first side of the light filter 20. The light emitted from the light source 10 may be transmitted to the first side of the light filter 20 by the light diffraction element 30 and may be reflected from the light filter 20 to be directed toward the exterior of the vehicle to prevent transmission to the interior of the vehicle.

As described above, the present disclosure may include the light source 10, the light filter 20, and the light diffraction element 30, and the light emitted from the light source 10 may be transmitted to the light filter 20 through the light diffraction element 30 and may be reflected from the light filter 20 to the exterior, to prevent light from being transmitted to the interior of the vehicle. The first wavelength band of the light emitted from the light source 10 may depend on desired colors or light. For example, the light source 10 may be an LED or a laser configured to emit light having a wavelength band of about 600-670 nm to implement a red color.

The light filter 20 may be a dichroic mirror configured to reflect light having a first wavelength band and transmit light having a second wavelength band that is different from the first wavelength band. When the light filter 20 is a transparent dichroic mirror, as described above, an interior visual field may be secured through the dichroic mirror. Further, light having a first wavelength band may be reflected from the first side of the light filter 20 to the exterior when the light source 10 is turned on. Accordingly, a lighted image produced by the reflected light may be viewed from the exterior of the vehicle. Further, when the light emitted from the light source 10 is not transmitted to the interior by the light filter 20, the light emitted from the light source 10 does not interfere with the visual fields of passengers by being transmitted into the interior of the vehicle.

In particular, the light diffraction element 30 may be configured to receive the light emitted from the light source 10 and adjust the transmission path of the incident light to direct the light to be incident to the first side of the light filter 20. The light diffraction element 30 may include a diffractive lens configured to diffract light emitted from the light source 10 to direct the light toward the light filter 20. In other words, the light diffraction element 30 may be a diffractive optical element (DOE) configured to diffract light emitted from the light source 10 to direct the light to the light filter 20, using the characteristics of the DOE.

According to the present disclosure, the light filter 20 may be disposed on rear glass G and the light source 10 and the light diffraction element 30 may be disposed to direct light to the first side of the light filter 20, and light emitted from the light source 10 disposed in the interior may be diffracted by the light diffraction element 30 to the light filter 20 and may be reflected from the light filter 20. Accordingly, a lighting image may be recognizable from the exterior of the vehicle through the rear glass G. Further, when the light filter 20 reflects light having a first wavelength band, when the light source 10 is turned off, light having the second wavelength band that is different from the first wavelength band may be transmitted through the light filter 20. Accordingly, the exterior may be visible through a lighting image area A that is produced when the light source 10 is turned on, thereby securing a visual field.

The present disclosure is described in detail. The light source 10 may be disposed at a side above or below the light filter 20 and the light diffraction element 30 may be disposed above or below the light filter 20 and configured to receive light from the light source 10. When the light source 10 is disposed above the light filter 20, as described above, the light source 10 may be disposed on a roof panel. When the light source 10 is disposed under the light filter 20, the light source may be disposed on a body panel. When the light source 10 is disposed above the light filter 20, the light source may be positioned to emit light in a downward direction. When the light source 10 is disposed under the light filter 20, the light source 10 may be positioned to emit light in an upward direction. The light source 10 may be disposed under the light filter 20 in the present disclosure.

The light diffraction element 30 may be disposed in the path of the light emitted from the light source 10 and the light emitted from the light source 10 may be diffracted to the second side, that is, to the interior by the light diffraction element 30. Accordingly, the light may be transmitted to the first side of the light filter 20. In particular, when the light source 10 and the light diffraction element 30 are disposed at a side of the light filter 20, light having a first wavelength band emitted from the light source 10 may be diffracted to the first side of the light filter 20 by the light diffraction element 30. Accordingly, the light may be reflected from the light filter 20 to be directed toward the exterior of the vehicle to prevent transmission to the interior of the vehicle. As described above, when the path of the light emitted from the light source 10 is adjusted by the light diffraction element 30, the layout of the lamp apparatus may be reduced by decreasing the light path. Further, when the light emitted from the light source 10 is directed to the light filter 20, a loss of light may be reduced.

Additionally, in another exemplary embodiment of the present disclosure, as shown in FIG. 2, a plurality of light sources 10 may have a linear arrangement at a side of the light filter 20 and configured to direct light emitted from the light sources 10 to the light filter 20 through the light diffraction element 30. Accordingly, light emitted from the light sources 10 may be directed to the light filter 20, having the plurality of light sources 10 in a linear arrangement at a side of the light filter 20 and the light emitted from each of the light sources 10 may be directed to the light filter 20 through the light diffraction element 30, to provide more improved light quantity and direct light to the light filter 20.

In particular, when light is directed to the light filter 20 through the light diffraction element 30 even though there is a single light source 10, the light diffraction element 30 is a DOE. Accordingly, the light emitted from the light source 10 may be concentrated on the center of the light filter 20 due to the characteristics of the DOE. Accordingly, by providing a plurality of light sources 10 and arranging the light sources 10 in the longitudinal direction of the light diffraction element 30, the light emitted from the light sources 10 may be transmitted to the entire light filter 20, to produce a clearer lighting image. Further, the greater the distance the light sources 10 are disposed at a side from the light filter 20, the greater the intensity of light.

As shown in FIG. 2, when there are a plurality of light sources 10, light is emitted to the entire light filter 20, however, the distances from each of the light sources 10 to the first side of the light filter 20 are different. Accordingly, the illuminance distribution may be different. The light diffraction element 30 configured to diffract the light emitted from the light sources 10 may be divided into a plurality of sections to correspond to each of the light sources 10. Accordingly, by setting the intensity of light greater as the light sources 10 are disposed at a side at an increasing distance away from the light filter 20, the illuminance distribution of the light reaching the first side of the light filter 20 may be more uniform.

For example, referring to FIG. 2, when a first light source 10*a* is disposed a greater distance from the light filter 20, a second light source 10*b* may be disposed at a distance that is closer to the light filter 20 than the first light source 10*a*, and a third light source 10*c* may be disposed closest to the light filter 20, in order of proximity to the light filter 20. The intensity of light from the first light source 10*a* may be the greatest. The intensity of light from the second light source 10*b* may be set to be less than the intensity of light emitted from the first light source 10*a*. The intensity of light from the third light source 10*c* may be set to be the lowest amount. Accordingly, the intensities of light may be determined in accordance with the distances that the light emitted from each of the light sources 10 is transmitted to the light filter 20. Accordingly, when there are a plurality of light sources 10, light may more uniformly travel to the light filter 20, to provide a clearer lighting image.

Moreover, as shown in FIGS. 1 to 3, the apparatus may further include a light guide 40 disposed at a side of the light filter 20 and configured to guide light emitted with a specific incident angle from the light source 10 to the exterior. The light guide 40 may include the light filter 20 and may be configured to diffract light emitted from the light source 10 or light reflected from the light filter 20 to the exterior. In particular, the light guide 40 may adjust the distribution and transmission direction of light having a specific incident light and it may be hologram optical element (HOE) or a Diffractive optical element (DOE).

In particular, the light guide 40 may be a hologram lens that produces a specific image by reflecting light emitted from the light source 10 and having a specific incident angle to the exterior. In other words, as shown in FIG. 2, the light emitted from the light source 10 may be diffracted by the light diffraction element 30 toward the light guide 40 and the light guide 40 may be a hologram lens. Accordingly, when the light reaches the light guide 40, a recorded hologram image may be formed. For example, according to the principle of recording a hologram image on a hologram lens, when reference light is radiated to an object at a predetermined angle at the opposite side of the object with a hologram lens therebetween, an image by the reference light may be recorded on the hologram lens and object light produced when the reference light is diffusion-reflected from the object may also be recorded on the hologram lens. Accordingly, an interference pattern may be formed on the hologram lens by interference between the reference light and the object light. The interference pattern formed may be the recorded hologram image implemented by the hologram lens.

Additionally, by making the angle of the light reaching the hologram lens the same as the incident angle of the reference light, a recorded hologram image may appear when light reaches the hologram lens. The angle of the light emitted from the light source 10, reflected from the reflector 30, and reaching the hologram lens may be determined to be the same as the angle of the reference light in recording. Therefore, as shown in FIG. 1, the light emitted from the light source 10 may be reflected from the reflector 30 toward the light guide 40 and the light guide 40 may be a hologram lens. When the light reaches the light guide 40, a hologram image may be formed by reflecting the incident light. In particular, the light passing through the light guide 40 may be transmitted to the light filter 20 and the light filter 20 may reflect light emitted with a first wavelength band from the light source 10, to prevent the light from being transmitted into the interior of the vehicle.

In another exemplary embodiment, as shown in FIG. 3, the light guide 40 may be a diffractive lens that when the light emitted from the light source 10 is received, may be configured to transmit the incident light, and when the transmitted light is reflected by the light filter 20 to be incident at a specific angle, may be configured to diffract the transmission direction of the light to travel the light toward the exterior of the vehicle. As shown in FIG. 3, the light emitted from the light source 10 may be reflected from the reflector 30 toward the light guide 40 and the light guide 40 may be a diffractive lens. Accordingly, when the light reaches the light guide 40 at a specific angle, the light guide 40 may be configured to diffract the light to the exterior of the vehicle.

In particular, the light emitted from the light source 10 may be transmitted to the light guide 40 and the light filter 20 by the reflector 30. However, the incident angle of the light reaching the light guide 40 is not the angle required by the diffractive lens that is the light guide 40. Accordingly, the light may be configured to pass with the incident light through the light guide 40. As described above, when the light passing through the light guide 40 is transmitted to the light filter 20 and the light filter 20 may be configured to reflect light emitted with a first wavelength band from the light source 10. Accordingly, the light may be again reflected. Further, the light reflected from the light filter 20 may be transmitted back to the light guide 40, in which the incident angle is the specific angle required by the light guide 40, and the light may be diffracted to the exterior of the vehicle.

Accordingly, light emitted with a first wavelength band from the light source 10 may be prevented from transmission to the interior of the vehicle by the light filter 20 and the light reflected from the light filter 20 may be diffracted to the exterior of the vehicle by the light guide 40 that is a diffractive lens.

Additionally, as shown in FIG. 4, the rear lamp apparatus of a vehicle may include a light sources 10 disposed at the rear part in a vehicle and configured to emit light having a first wavelength band, a light filter 20 disposed in the vehicle to correspond to a rear glass G at the rear part of the vehicle, with a first side facing the exterior facing the rear glass G and a second side facing the interior of the vehicle, and configured to reflect light having a first wavelength band, and transmit light having a second wavelength band that is different from the first wavelength band and a light diffraction element 30 configured to receive light emitted from the light source 10 and adjust a moving path of incident light to direct the light to be incident to the first side of the light filter 20. The light emitted from the light source 10 may be directed to the first side of the light filter 20 by the light diffraction element 30 and may be reflected from the light filter 20 to be emitted the exterior of the vehicle to prevent transmission to the interior of the vehicle.

As described above, when the light sources 10 are disposed at the rear portion in a vehicle and light emitted from the light sources 10 and transmitted to the light filter 20 provided on the rear glass G by the light diffraction element, the light emitted from the light sources 10 provided in the interior may be reflected from the light filter 20 and then may produce a lighting image that may be recognized from the exterior through the rear glass G. In particular, the light emitted from the light source 10 may be prevented from transmission into the interior by the light filter 20, thereby making recognition of the light emitted from the light source 10 difficult to prevent a difference due to light.

In particular, since the light filter 20 reflects light having a first wavelength band when the light source 10 is turned off, light having a second wavelength band except for the specific wavelength band passes through the light filter 20. Accordingly, the exterior visual field may be secured through a lighting image area A that is produced when the light source 10 is turned on. Therefore, as shown in FIG. 5, when the light source 10 is turned on, a lighting image may be implemented through specific areas A of the rear glass G, and when the light source 10 is turned off, the exterior and interior visual fields may be secured through the areas A where the lighting image is implemented.

According to the rear lamp apparatus of a vehicle having the structure described above, a rear lamp may be turned on at a side of the rear glass G and exterior and interior visual fields may be secured through the lighting area A in non-lighting. Therefore, the external appearance of a vehicle may be more freely designed and a new type of rear lamp using rear glass G is achieved.

Although the present disclosure was described with reference to exemplary embodiments shown in the drawings, it is apparent to those skilled in the art that the present disclosure may be changed and modified in various ways without departing from the scope of the present disclosure, which is described in the following claims.

What is claimed is:

1. A rear lamp apparatus of a vehicle, comprising:
   one or more light source configured to emit light having a first wavelength band;
   a light filter disposed with a first side facing an exterior of the vehicle and a second side facing an interior of the vehicle, that is configured to reflect light having the first wavelength band, and transmit light having a second wavelength band that is different from the first wavelength band; and
   a light diffraction element disposed to receive light emitted from the light source and adjust a transmission path of incident light to direct the light to be incident to the first side of the light filter,
   wherein light emitted from the light source is transmitted to the first side of the light filter by the light diffraction element and is reflected from the light filter to be directed toward the exterior of the vehicle to prevent the transmission to the interior of the vehicle,
   wherein the light source is disposed at a side above or below the light filter, and the light diffraction element is disposed in parallel to the light source, but not parallel to the light filter at the side above or below the light filter to receive light emitted from the light source,
   wherein a plurality of light sources have a linear arrangement at an increasing distance away from the light filter at a side of the light filter, and light emitted from each of the light sources is transmitted to the light filter through the light diffraction element, and
   wherein the light diffraction element is divided into a plurality of sections corresponding to the plurality of light sources, respectively, and the plurality of sections are arranged linearly away from the light filter at the side of the light filter to face the plurality of light sources, such that an intensity of the light emitted from the light sources is greater for the light sources located a greater distance away from the light filter.

2. The apparatus of claim 1, wherein the light diffraction element is a diffractive lens, is configured to diffract a transmission direction of the incident light to direct light toward the light filter when light emitted from the light source is received.

3. The apparatus of claim 1, further comprising: a light guide disposed at a side of the light filter and configured to guide light emitted with a specific incident angle from the light source to the exterior.

4. The apparatus of claim 3, wherein the light guide is a hologram lens configured to produce a specific image by reflecting light emitted from the light source and having a specific incident angle to the exterior.

5. The apparatus of claim 3, wherein the light guide is a diffractive lens is configured to transmit the incident light when the light emitted from the light source is received, and, is configured to diffract the transmission direction of the light to direct the light toward the exterior of the vehicle when the transmitted light is reflected by the light filter to be incident at a specific angle.

6. A rear lamp apparatus of a vehicle, comprising:
one or more light source disposed at a rear portion in a vehicle and configured to emit light having a first wavelength band;
a light filter disposed in the vehicle to correspond to a rear glass at the rear portion of the vehicle, with a first side facing an exterior of the vehicle facing the rear glass and a second side facing an interior of the vehicle, and configured to reflect light having the first wavelength band, and configured to transmit light having a second wavelength band that is different from the first wavelength band; and
a light diffraction element configured to receive light emitted from the light source and adjust a transmission path of incident light to direct the light to be incident to the first side of the light filter,
wherein the light emitted from the light source is transmitted to the first side of the light filter by the light diffraction element and is reflected from the light filter to be emitted to the exterior of the vehicle to prevent transmission to the interior of the vehicle,
wherein the light source is disposed at a side above or below the light filter, and the light diffraction element is disposed in parallel to the light source, but not parallel to the light filter at the side above or below the light filter to receive light emitted from the light source,
wherein a plurality of light sources have a linear arrangement at an increasing distance away from the light filter at a side of the light filter, and light emitted from each of the light sources is transmitted to the light filter through the light diffraction element, and
wherein the light diffraction element is divided into a plurality of sections corresponding to the plurality of light sources, respectively, and the plurality of sections are arranged linearly away from the light filter at the side of the light filter to face the plurality of light sources, such that an intensity of the light emitted from the light sources is greater for the light sources located a greater distance away from the light filter.

7. The apparatus of claim 6, further comprising: a light guide disposed at a side of the light filter and configured to guide light emitted with a specific incident angle from the light source to the exterior.

8. The apparatus of claim 7, wherein the light guide is a hologram lens configured to produce a specific image by reflecting light emitted from the light source and having a specific incident angle to the exterior.

9. The apparatus of claim 7, wherein the light guide is a diffractive lens configured to transmit the incident light when the light emitted from the light source is received, and is configured to diffract the transmission direction of the light to direct the light toward the exterior of the vehicle when the transmitted light is reflected by the light filter to be incident at a specific angle.

* * * * *